United States Patent
Jeon et al.

(10) Patent No.: US 9,811,460 B2
(45) Date of Patent: Nov. 7, 2017

(54) SYSTEM INCLUDING MULTI CHANNEL MEMORY AND OPERATING METHOD FOR THE SAME

(71) Applicant: Samsung Electronics Co., Ltd., Suwon-si (KR)

(72) Inventors: Seung-Hong Jeon, Seoul (KR); Hyeok-Man Kwon, Suwon-si (KR); Nak-Hee Seong, Gwacheon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 281 days.

(21) Appl. No.: 14/612,516

(22) Filed: Feb. 3, 2015

(65) Prior Publication Data
US 2015/0221349 A1   Aug. 6, 2015

(30) Foreign Application Priority Data
Feb. 3, 2014   (KR) .................... 10-2014-0012165

(51) Int. Cl.
*G06F 12/02*   (2006.01)
*G11C 7/10*   (2006.01)
*G06F 12/06*   (2006.01)

(52) U.S. Cl.
CPC ...... *G06F 12/0246* (2013.01); *G06F 12/0607* (2013.01)

(58) Field of Classification Search
None
See application file for complete search history.

(56) References Cited

U.S. PATENT DOCUMENTS

| | | | |
|---|---|---|---|
| 6,505,287 B2 | 1/2003 | Uematsu | |
| 8,086,783 B2 | 12/2011 | O'Connor et al. | |
| 8,332,569 B2 | 12/2012 | Kim et al. | |
| 8,375,173 B2 | 2/2013 | Wang et al. | |
| 2004/0139290 A1* | 7/2004 | Wolrich | G06F 12/0607 711/157 |
| 2010/0274976 A1 | 10/2010 | Kang et al. | |
| 2011/0320751 A1 | 12/2011 | Wang et al. | |
| 2012/0054455 A1* | 3/2012 | Wang | G06F 13/1647 711/157 |
| 2012/0079170 A1 | 3/2012 | Chang et al. | |
| 2012/0297128 A1 | 11/2012 | Eleftheriou et al. | |

FOREIGN PATENT DOCUMENTS

| | | |
|---|---|---|
| JP | 2009-223433 A | 10/2009 |
| JP | 2011-013835 A | 1/2011 |
| JP | 2011-215805 A | 10/2011 |

* cited by examiner

*Primary Examiner* — Yaima Rigol
(74) *Attorney, Agent, or Firm* — Muir Patent Law, PLLC

(57) ABSTRACT

Provided is a system including a multi channel memory and an operating method for the same. The multi channel memory may include a respective set of memories, wherein each set may include one or more memories. The operating method includes receiving access requests including system addresses for a multi channel memory having $2^n$ channels, where n is a natural number greater than 0, allocating a first channel of the $2^n$ channels based on n+1 or more bits of a first address of the system addresses, and performing an access of a respective set of memory devices through the allocated first channel.

18 Claims, 9 Drawing Sheets

FIG. 6

| ADD | 0x000<br>\|<br>0x07F | 0x080<br>\|<br>0x0FF | 0x100<br>\|<br>0x17F | 0x180<br>\|<br>0x1FF | 0x200<br>\|<br>0x27F | 0x280<br>\|<br>0x2FF | 0x300<br>\|<br>0x37F | 0x380<br>\|<br>0x3FF |
|---|---|---|---|---|---|---|---|---|
| CH | 0 | 2 | 1 | 3 | 0 | 2 | 1 | 3 |
| ADD | 0x400<br>\|<br>0x47F | 0x480<br>\|<br>0x4FF | 0x500<br>\|<br>0x57F | 0x580<br>\|<br>0x5FF | 0x600<br>\|<br>0x67F | 0x680<br>\|<br>0x6FF | 0x700<br>\|<br>0x77F | 0x780<br>\|<br>0x7FF |
| CH | 1 | 3 | 2 | 0 | 1 | 3 | 2 | 0 |
| ADD | 0x800<br>\|<br>0x87F | 0x880<br>\|<br>0x8FF | 0x900<br>\|<br>0x97F | 0x980<br>\|<br>0x9FF | 0xA00<br>\|<br>0xA7F | 0xA80<br>\|<br>0xAFF | 0xB00<br>\|<br>0xB7F | 0xB80<br>\|<br>0xBFF |
| CH | 2 | 0 | 3 | 1 | 2 | 0 | 3 | 1 |
| ADD | 0xC00<br>\|<br>0xC7F | 0xC80<br>\|<br>0xCFF | 0xD00<br>\|<br>0xD7F | 0xD80<br>\|<br>0xDFF | 0xE00<br>\|<br>0xE7F | 0xE80<br>\|<br>0xEFF | 0xF00<br>\|<br>0xF7F | 0xF80<br>\|<br>0xFFF |
| CH | 3 | 1 | 0 | 2 | 3 | 1 | 0 | 2 |

2000

SYSTEM INCLUDING MULTI CHANNEL MEMORY AND OPERATING METHOD FOR THE SAME

CROSS-REFERENCE TO RELATED APPLICATION

This application claims priority under 35 USC §119 to Korean Patent Application No. 10-2014-0012165 filed on Feb. 3, 2014 in the Korean Intellectual Property Office, the contents of which in its entirety are herein incorporated by reference.

BACKGROUND

1. Field

The present disclosure relates to a system comprising a multi channel memory and an operating method for the same.

2. Description of the Related Art

A multi channel memory generally refers to a memory system having multiple channels. A channel corresponds to a path through which various types of signals, such as data, are transmitted and received. At least one memory device may be connected to each channel. A master device may be allocated with one of the multiple channels and may access the memory device through the allocated channel.

The multi channel memory may operate by a channel interleaving method. In the channel interleaving method, consecutive memory addresses are allocated to memory devices connected to different channels to access memory devices in a pipelined manner. For example, the master device may access a second memory device through a second channel while accessing a first memory device through a first channel, using the channel interleaving method. The channel interleaving method is widely used for increasing a bandwidth of the multi channel memory.

However, when accesses repeatedly occur through one or some of multiple channels without accessing consecutive memory addresses of the multi channel memory, a bottleneck phenomenon may occur to the one or some of multiple channels.

SUMMARY

The present disclosure provides a system comprising a multi channel memory, which can help prevent a bottleneck phenomenon from occurring to one or some of channels.

The present disclosure also provides an operating method for a system comprising a multi channel memory, which can help prevent a bottleneck phenomenon from occurring to one or some of the channels.

According to an aspect of the present inventive concept, there is provided an operating method for a system comprising a multi channel memory. The multi channel memory may include a respective set of memories, wherein each set may include one or more memories. The operating method may include receiving access requests including system addresses for a multi channel memory including $2^n$ channels, where n is a natural number, allocating a first channel of the $2^n$ channels based on n+1 or more bits of a first address of the system addresses, and performing an access of a respective set of memory devices through the allocated first channel.

According to another aspect of the present inventive concept, there is provided an operating method for a system comprising a multi channel memory, each channel connected to a respective set of memories, wherein each set includes one or more memories. The operating method may include receiving access requests including logical addresses for a multi channel memory having multiple channels, wherein the logical addresses include an overall range of addresses from a first address to a final address, allocating all of the multiple channels in response to the logical addresses, and performing an access from/to a respective set of memories through the allocated first channel, wherein the allocating all of the multiple channels is performed in a first order in a first particular range of the overall range of addresses and in a second order different from the first order in a second particular range of the overall range of addresses different from the first range based on a minimum number of bits of the logical addresses required for allocating all of the multiple channels and one or more additional bits of the logical addresses.

According to still another aspect of the present inventive concept, there is provided a system including n channels and a first circuit. Each of the n channels may be connected to a respective set of memory devices and each set may include one or more memory devices, n being a natural number greater than 1. The first circuit may be configured to receive access requests including addresses, and allocate one channel of the n channels to access a respective set of memory devices through the allocated channel in response to an address. The first circuit may be configured to allocate each channel of the n channels based on a minimum number of bits of the addresses required for allocating all of the n channels and one or more additional bits of the addresses.

BRIEF DESCRIPTION OF THE DRAWINGS

The above and other features and advantages of the present inventive concept will become more apparent by describing in example embodiments thereof with reference to the attached drawings in which:

FIG. 6 is an exemplary table illustrating of allocating channels based on logical addresses according to one embodiment of the present inventive concept.

DETAILED DESCRIPTION OF THE EMBODIMENTS

Figure 1:
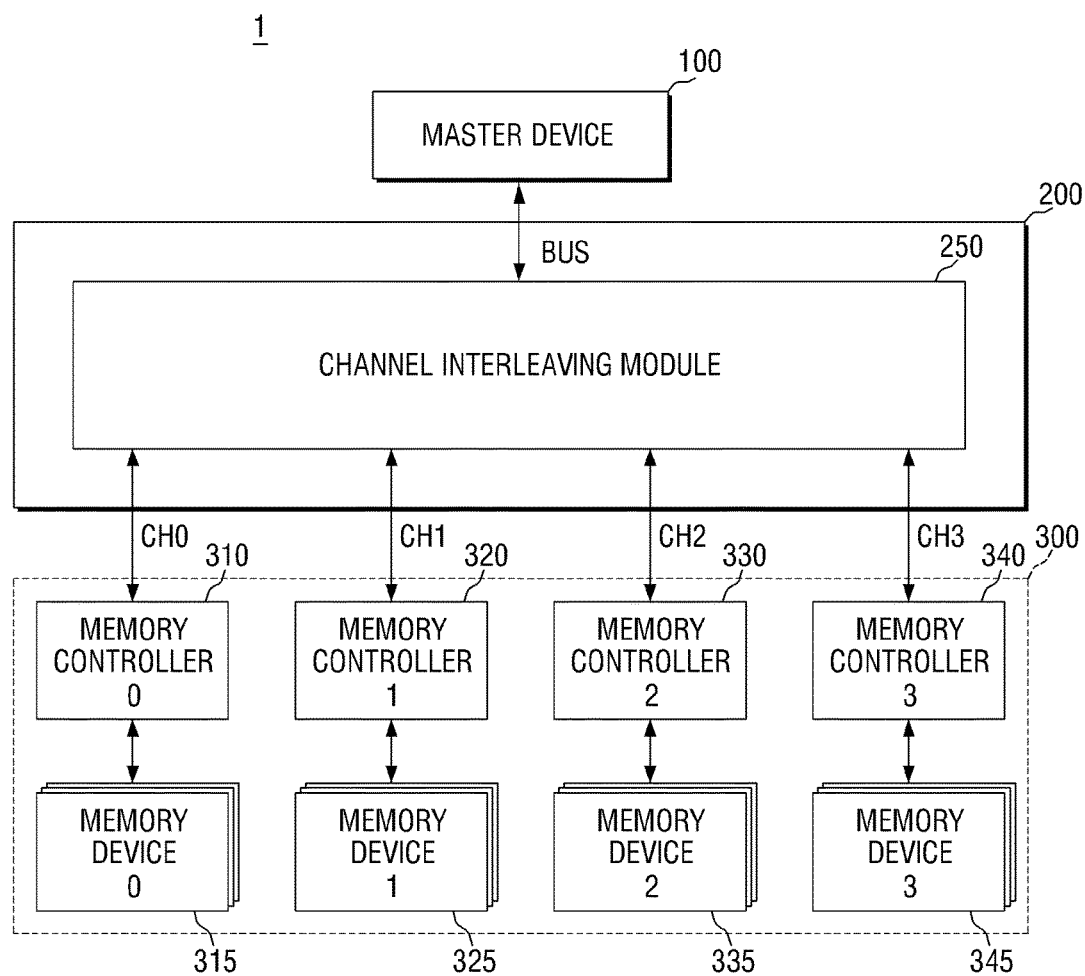
FIG. 1 is an exemplary block diagram of a system comprising a multi channel memory according to an embodiment of the present inventive concept.

The present disclosure will now be described more fully hereinafter with reference to the accompanying drawings, in which some example embodiments are shown. This disclosure may, however, be embodied in different forms and should not be construed as limited to the embodiments set forth herein. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," "comprises," "includes," and/or "containing" are to be construed as open-ended terms (i.e., meaning "including, but not limited to,") unless otherwise noted, and when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms unless the context indicates otherwise. Unless indicated otherwise, these terms are only used to distinguish one element from another. For example, a first signal could be termed a second signal, and, similarly, a second signal could be termed a first signal without departing from the teachings of the disclosure.

Unless the context indicates otherwise, terms such as "same," "planar," "equal," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to typical manufacturing processes. The term "substantially" may be used herein to reflect this meaning.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process. Thus, regions shown in the drawings are illustrated in schematic form and the shapes of the regions are presented simply by way of illustration and not as a limitation.

FIG. 1 is an exemplary block diagram of a system comprising a multi channel memory according to an embodiment of the present inventive concept.

Referring to FIG. 1, the system 1 comprising a multi channel memory according to an embodiment of the present inventive concept includes a master device 100, a bus 200, and a multi channel memory 300.

The master device 100 may be connected to the bus 200. The master device 100 may access the multi channel memory 300 through the bus 200. The accessing of the multi channel memory 300 may include reading data from the multi channel memory 300 or writing data to the multi channel memory 300. For example, the master device 100 may be a processor, but aspects of the present inventive concept are not limited thereto. The master device 100 may be an intellectual property (IP) module for processing data, such as a central processing unit (CPU), a graphic processing engine, or an image signal processor (ISP).

To access the multi channel memory 300, the master device 100 may transmit an access request for the multi channel memory 300 to the bus 200. The access request may include a memory read request or a memory write request. The access request for the multi channel memory 300 may include a memory address or data. Here, the memory address may be, for example, a logical address, a system address, or a virtual address.

The bus 200 may exchange various types of information between the master device 100 and the multi channel memory 300. The bus 200 may include a channel interleaving module 250. The channel interleaving module 250 may receive an access request for the multi channel memory 300 from the master device 100 and may process the received access request. The channel interleaving module 250 may allocate one of multiple channels of the multi channel memory 300 by referencing the memory address received from the master device 100. The channel interleaving module 250 may include, for example, circuitry configured to perform the processing and allocation steps described herein. The channel interleaving module 250 may also be referred to herein as a channel interleaving circuit. The bus 200 may provide access for the multi channel memory 300 to the master device 100 through the allocated channel.

The multi channel memory 300 may have multiple channels, for example, CH0 to CH3 and may be connected to the bus 200 through the multiple channels CH0 to CH3. The channels CH0 to CH3 may correspond to paths through which various kinds of signals, such as data, addresses, and commands are transmitted or received. Although not specifically shown, each of the channels CH0 to CH3 may include a buffer that temporarily stores data.

In FIG. 1, a multi channel memory 300 having 4 channels is illustrated, but aspects of the present inventive concept are not limited thereto. For example, the multi channel memory 300 may have $2^n$ channels, where n is a natural number greater than 0. As another example, the multi channel memory 700 may have n channels, where n is a natural number greater than 1.

The multi channel memory 300 may transmit the read data to the master device 100 or may receive the data to be written from the master device 100, through the bus 200.

The multi channel memory 300 may include a plurality of memory controllers 310, 320, 330 and 340 and a plurality of memory devices 315, 325, 335 and 345. The memory controllers 310, 320, 330 and 340 may be connected to the channels CH0 to CH3, respectively. In addition, the memory devices 315, 325, 335 and 345 may be connected to the memory controllers 310, 320, 330 and 340, respectively. Each of the memory devices 315, 325, 335 and 345 may be a semiconductor device including at least one chip or at least one package.

As used herein, a memory device or a memory may refer to various items such as a semiconductor memory chip, a memory chip, a package including one or more memory chips, or combinations thereof. A memory device such as a memory chip may be formed from a semiconductor wafer. A memory device may comprise a package which may include one or more memory chips, such as memory chips stacked on a package substrate, or a package-on-package device including a plurality of packages.

An electronic device, as used herein, may refer to one of these devices and may also include products that include these devices, such as a memory module, a hard drive including additional components, a mobile phone, laptop, tablet, desktop, camera, server, computing system, or other consumer electronic device, etc.

The multi channel memory 300 may operate by a channel interleaving method. Accordingly, the master device 100 may access the plurality of memory devices 315, 325, 335 and 345 in a pipelined manner. For example, while accessing a first memory device 315 through a first allocated channel CH0, the master device 100 may access a second memory device 325 through a second allocated channel CH1. For another example, while accessing a first memory device 315 through a first allocated channel CH0, the master device 100 may access second to fourth memory devices 325, 335, and 345 through second to fourth allocated channels CH1, CH2, and CH3.

In one embodiment, each of the memory devices 315, 325, 335, and 345 may be a dynamic random access memory (DRAM). In other embodiment, each of the memory devices 315, 325, 335, and 345 may be, for example, a static random access memory (SRAM), a flash memory, a mobile DRAM, a phase random access memory (PRAM), a ferroelectric random access memory (FRAM), a resistive random access memory (RRAM), a magnetic random access memory (MRAM), etc.

Hereinafter, an operating method of a system comprising a multi channel memory according to an embodiment of the present inventive concept will be described using the components shown in FIG. 1. Here, it is assumed that the multi channel memory 300 has $2^n$ channels, where n is a natural number.

Figure 2:
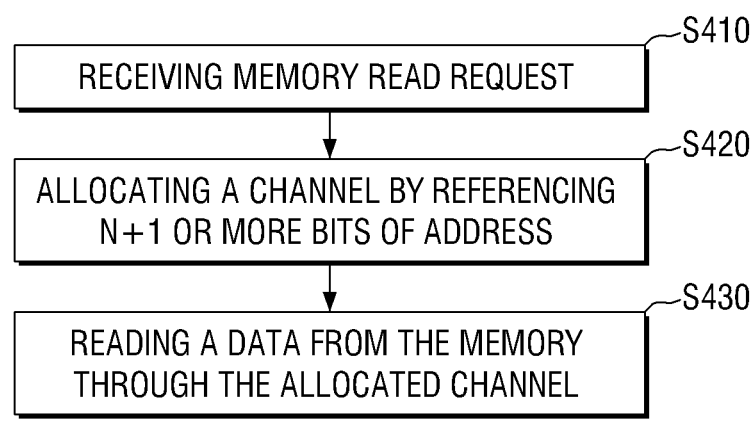
FIG. 2 is an exemplary flowchart illustrating a read operating method of a system comprising a multi channel memory according to an embodiment of the present inventive concept.

FIG. 2 is an exemplary flowchart illustrating a read operating method of a system comprising a multi channel memory according to an embodiment of the present inventive concept.

Referring to FIG. 2, in the read operating method of the system 1 comprising a multi channel memory according to an embodiment of the present inventive concept, first, the channel interleaving module 250 may receive a memory read request from the master device 100 (S410). As described above, the memory read request may include a memory address (also referred to as a logical address or a system address) as information for reading data from the multi channel memory 300.

Next, the channel interleaving module 250 may allocate one among multiple channels by referencing n+1 or more bits of the address of the memory read request (S420). As shown in FIG. 1, in one embodiment, in a case where the multi channel memory 300 has 4 channels CH0 to CH3, the channel interleaving module 250 may allocate one among 4 channels CH0 to CH3 by referencing 3 or more bits of the memory address of the memory read request.

A method of allocating a channel in the read operation method will be described below with reference to FIGS. 4 and 5.

Next, the master device 100 may read data from the multi channel memory 300 through the allocated channel (S430). In detail, the memory controller connected to the allocated channel may read the data from the memory device connected to the memory controller, and the read data may be provided to the master device 100 through the bus 200.

Figure 3:
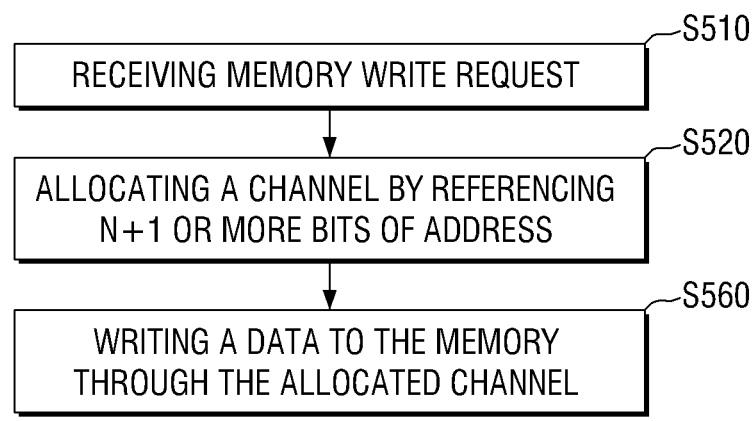
FIG. 3 is an exemplary flowchart illustrating a write operating method of a system comprising a multi channel memory according to an embodiment of the present inventive concept.

FIG. 3 is an exemplary flowchart illustrating a write operating method of a system comprising a multi channel memory according to an embodiment of the present inventive concept.

Referring to FIG. 3, in the write operating method of the system 1 comprising a multi channel memory according to an embodiment of the present inventive concept, first, the channel interleaving module 250 may receive a memory write request from the master device 100 (S510). As described above, the memory write request may include a memory address (e.g., a logical address or a system address) as information for writing data to the multi channel memory 300.

Next, the channel interleaving module 250 may allocate one among multiple channels by referencing n+1 or more bits of the address of the memory write request (S520). As shown in FIG. 1, in one embodiment, in a case where the multi channel memory 300 has 4 channels CH0 to CH3, the channel interleaving module 250 may allocate one among 4 channels CH0 to CH3 by referencing 3 or more bits of the memory address of the memory write request.

A method of allocating a channel in the write operation method will be described below with reference to FIGS. 4 and 5.

Next, the master device 100 may write data in the multi channel memory through the allocated channel (S530). In detail, the data to be written in the multi channel memory is provided to the memory controller connected to the allocated channel through the bus 200, and the memory controller may write the data in the memory device connected to the memory controller.

Figure 4:
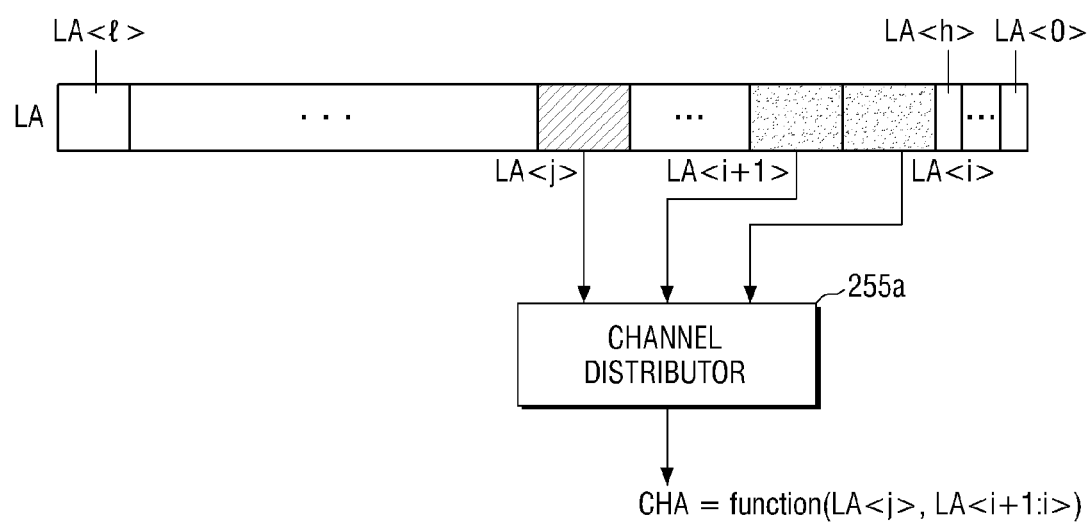
FIGS. 4 and 5 specifically illustrate channel allocating steps shown in FIGS. 2 and 3.
Figure 5:
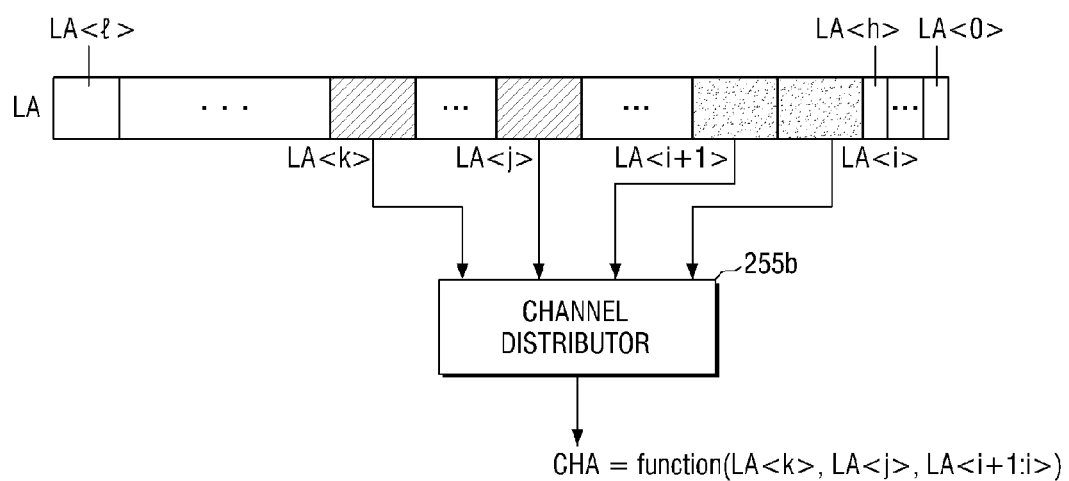

FIGS. 4 and 5 specifically illustrate channel allocating steps shown in FIGS. 2 and 3.

Referring to FIG. 4, a channel distributor 255a may generate a channel address CHA using a memory address LA. The channel distributor 255a may be provided as an internal component of the channel interleaving module 250 and may include circuitry configured to perform channel distribution steps described herein. The channel distributor 255a may also be referred to herein as a channel distributor circuit. As an example, the channel distributor 255a may use one additional bit as well as a minimum number of bits required for allocating multiple channels. The memory address LA may include a number of bits of LA<1> . . . , LA<j>, . . . , LA<i+1>, LA<i>, . . . LA<h>, . . . LA<0>.

The minimum number of bits required for allocating multiple channels is defined as "requisite bits" to be used below. In general, in order to allocate $2^n$ channels, where n is a natural number greater than 0, at least n bits of the channel address are required. That is to say, the number of requisite bits for allocating the $2^n$ channels is n.

As shown in FIG. 1, in a case where the multi channel memory 300 has 4 channels CH0 to CH3, the number of requisite bits for allocating channels is 2. Considering that one additional bit as well as the requisite bits is used, the channel distributor 255a may generate the channel address CHA by referencing 3 bits of the memory address LA.

Here, the channel distributor 255a may use two consecutive bits LA<i+1:i> of the memory address LA as the requisite bits for allocating channels. The lower bits LA<h>, . . . LA<0> than the bits LA<i+1:i> may correspond to an interleave unit of the multi channel memory 300. Here, the interleave unit may indicate a size of the data distributed to different memory devices to then be stored in the channel interleaving method. For example, if a number of the bits LA<h>, . . . LA<0> is 4, a size of the interleave unit may be 16.

The channel distributor 255a may also use two consecutive bits LA<i+1:i> and a bit LA<j> of a higher bit (also referred to as an "upper bit") than the requisite bits LA<i+1:i> of the memory address LA as the one additional bit for allocating channels.

The additional bit LA<j> may be a bit spaced apart from the requisite bits LA<i+1:i>. Alternatively, the additional bit LA<j> may be a bit adjacent to the requisite bits LA<i+1:i>.

The channel distributor 255a may generate the channel address CHA as a result value of the function having elements of the requisite bits LA<i+1:i> and the additional bit LA<j>.

In one embodiment, if the requisite bits LA<i+1:i> are A2 and A1, and the additional bits LA<j> is A5, the channel address CHA may be generated by, for example, an exclusive OR (XOR) operation using bits A5, A2, and A1, but may be generated by other operation using the same bits. For example, the channel distributor 255a may generate first and second channel pre-addresses A2' and A1'. The first channel pre-address A2' may be generated in 4 bits by a function (e.g., an XOR operation) using bits A5 and A2. The second channel pre-address A1' may be generated in 2 bits using bit A1. Therefore, a number of cases which may allocate the channels may be 8. In this case, it is assumed that if A2'/A1' are 0/0 then the channel distributor 255a may allocate channel 0, A2'/A1' are 0/1 then the channel distributor 255a may allocate channel 2, A2'/A1' are 1/0 then the channel distributor 255a may allocate channel 1, A2'/A1' are 1/1 then the channel distributor 255a may allocate channel 3. Therefore, by using the requisite number of bits plus one or more additional bits, channels can be allocated in different orders through the operation of a multi channel memory. Accordingly, the channel distributor 255a may allocate the channels in a more distributed manner.

Referring to FIG. 5, as another example, a channel distributor 255b may use two additional bits as well as a minimum number of bits required for allocating multiple channels.

As shown in FIG. 1, in a case where the multi channel memory 300 has 4 channels CH0 to CH3, the number of requisite bits for allocating channels is 2. Considering that two additional bits as well as the requisite bits are used, the channel distributor 255b may generate a channel address CHA by referencing 4 bits of the memory address LA. The memory address LA may include a number of bits of LA<1> . . . , LA<j>, . . . , LA<i+1>, LA<i>, . . . LA<h>, . . . LA<0>.

The channel distributor 255b may use two consecutive bits LA<i+1:i> of the memory address LA as the requisite bits for allocating channels.

The channel distributor 255b may also use two consecutive bits LA<i+1:i> and bits LA<j> and LA<k> of higher bits than the requisite bits LA<i+1:i> of the memory address LA as the two additional bits for allocating channels.

The additional bit LA<j> may be a bit spaced apart from the requisite bits LA<i+1:i>. Alternatively, the additional bit LA<j> may be a bit adjacent to the requisite bits LA<i+1:i>.

In addition, the additional bit LA<k> and the additional bit LA<j> may be bits spaced apart from each other. Alternatively, the additional bit LA<k> and the additional bit LA<j> may be bits adjacent to each other.

The channel distributor 255b may generate the channel address CHA as a result value of the function having elements of the requisite bits LA<i+1:i> and the additional bits LA<j> and LA<k>.

In one embodiment, if the requisite bits LA<i+1:i> are A2 and A1, and the additional bits LA<k> and LA<j> are A5 and A4, the channel address CHA may be generated by, for example, an exclusive OR (XOR) operation using bits A5, A4, A2, and A1, but may be generated by other operations using the same bits. For example, the channel distributor 255b may generate first and second channel pre-addresses A2' and A1'. The first channel pre-address A2' may be generated in 4 bits by a first function (e.g., an XOR operation) using bits A5 and A2. The second channel pre-address A1' may be generated in 4 bits by a second function (e.g., an XOR operation) using bits A4 and A1. Therefore, a number of cases which may allocate the channels may be 16. In this case, it is assumed that if A2'/A1' are 0/0 then the channel distributor 255b may allocate channel 0, A2'/A1' are 0/1 then the channel distributor 255b may allocate channel 2, A2'/A1' are 1/0 then the channel distributor 255b may allocate channel 1, A2'/A1' are 1/1 then the channel distributor 255b may allocate channel 3. Therefore, by using the requisite number of bits plus one or more additional bits, channels can be allocated in different orders through the operation of a multi channel memory. Accordingly, the channel distributor 255b may allocate the channels in a more distributed manner.

FIG. 6 is an exemplary table illustrating of allocating channels based on logical addresses according to one embodiment of the present inventive concept.

Referring to FIG. 6, it is assumed that the master device 100 may transmit logical addresses including an overall range of addresses from a first address 0x000 to a final address 0xBFFF. A number of n channels are 4, CH0, CH1, CH2, and CH3. As shown in FIG. 6, for example, first through fourth sets of addresses may be 0x000 to 0x3FF, 0x400 to 0x7FF, 0x800 to 0xBFF, and 0xC00 to 0xFFF, respectively. The last address 0x3FF of the first set of addresses is a consecutive address with the first address 0x400 of the second set of addresses, etc. In one embodiment, a first order of allocated 4 channels may be CH0, CH2, CH1, and CH3 in a first range between 0x000 and 0x3FF of the first set of addresses, a second order of allocated 4 channels may be CH1, CH3, CH2, and CH0 in a second range between 0x400 and 0x7FF of the first set of addresses, a third order of allocated channels may be CH2, CH0, CH3, and CH1 in a third range between 0x800 and 0xBFF of the first set of addresses, and a fourth order of allocated channels may be CH3, CH1, CH0, and CH2 in a fourth order between 0xC00 and 0xFFF of the first set of addresses. Accordingly, when the master device 100 transmits logical addresses in a first pattern that is transmitted in an order in a row direction (e.g., 0x000, 0x001, . . . , 0x07F, 0x080, 0x081, . . . , 0xFFF) or in a second pattern that is transmitted in an order in a column direction (e.g., 0x000, 0x001, . . . , 0x07F, 0x400, 0x401, . . . , 0xFFF), the channels may be allocated in a more distributed manner.

Figure 7:
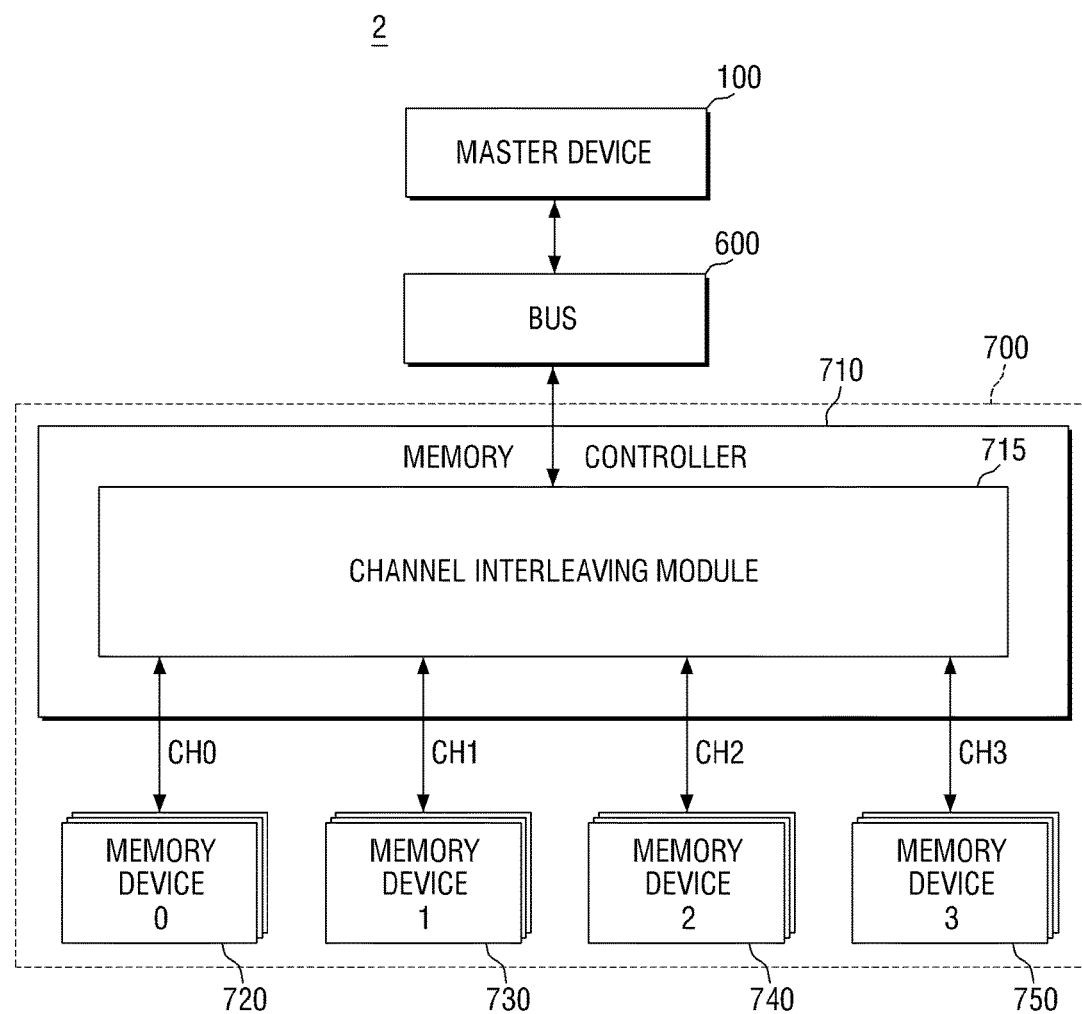
FIG. 7 is an exemplary block diagram of a system comprising a multi channel memory according to another embodiment of the present inventive concept.

FIG. 7 is an exemplary block diagram of a system comprising a multi channel memory according to another embodiment of the present inventive concept.

Referring to FIG. 7, the system 2 comprising a multi channel memory according to another embodiment of the present inventive concept includes a master device 100, a bus 600, and a multi channel memory 700. In the present embodiment, the same descriptions as described in the aforementioned embodiments will be omitted or mentioned briefly for the purpose of ease and convenience in explanation.

The master device 100 may be connected to the bus 600. The master device 100 may access the multi channel memory 700 through the bus 600. The accessing of the multi channel memory 700 may include reading data from the multi channel memory 700 or writing data to the multi channel memory 700.

To access the multi channel memory 700, the master device 100 may transmit an access request for the multi channel memory 700 to the bus 600. The bus 600 may transmit the access request to the multi channel memory 700. The access request may include a memory read request or a memory write request. Here, the memory address may be, for example, a logical address, a system address, or a real address.

The bus 600 may exchange various types of information between the master device 100 and the multi channel memory 700.

The multi channel memory 700 may be connected to the bus 600. The multi channel memory 700 may transmit the read data to the master device 100 or may receive the data to be written from the master device 100 through the bus 600.

The multi channel memory 700 may have multiple channels, for example, CH0 to CH3. The channels CH0 to CH3 may correspond to paths through which various kinds of signals, such as data, address, and command are transmitted or received. Although not specifically shown, each of the channels CH0 to CH3 may include a buffer that temporarily stores data.

In FIG. 7, the multi channel memory 700 having 4 channels is illustrated, but aspects of the present inventive concept are not limited thereto. For example, the multi channel memory 700 may have $2^n$ channels, where n is a natural number greater than 0. As another example, the multi channel memory 700 may have n channels, where n is a natural number greater than 1.

The multi channel memory 700 may include one memory controller 710 and a plurality of memory devices 720, 730, 740 and 750. The memory devices 720, 730, 740 and 750 may be connected to the memory controller 710 through the respective channels CH0 to CH3. Each of the memory devices 720, 730, 740 and 750 may include at least one memory chip or at least one package.

In the system 2 comprising a multi channel memory according to another embodiment of the present inventive concept, the memory controller 710, may include a channel interleaving module 715. The channel interleaving module 715 may receive an access request for the multi channel memory 700 from the master device 100 through the bus 600 and may perform the received access request. The channel interleaving module 715 may allocate one among multiple channels of the multi channel memory 700 by referencing the memory address received from the master device 100. In addition, the memory controller 710 may provide an access for the multi channel memory 700 to the master device 100 through the allocated channel.

The multi channel memory 700 may operate by a channel interleaving method. The master device 100 may access the plurality of memory devices 720, 730, 740 and 750 in a pipelined manner.

The system 2 comprising a multi channel memory according to another embodiment of the present inventive concept may operate in substantially same manner with the read operating method and the write operating method shown in FIGS. 2 and 3.

Figure 8:
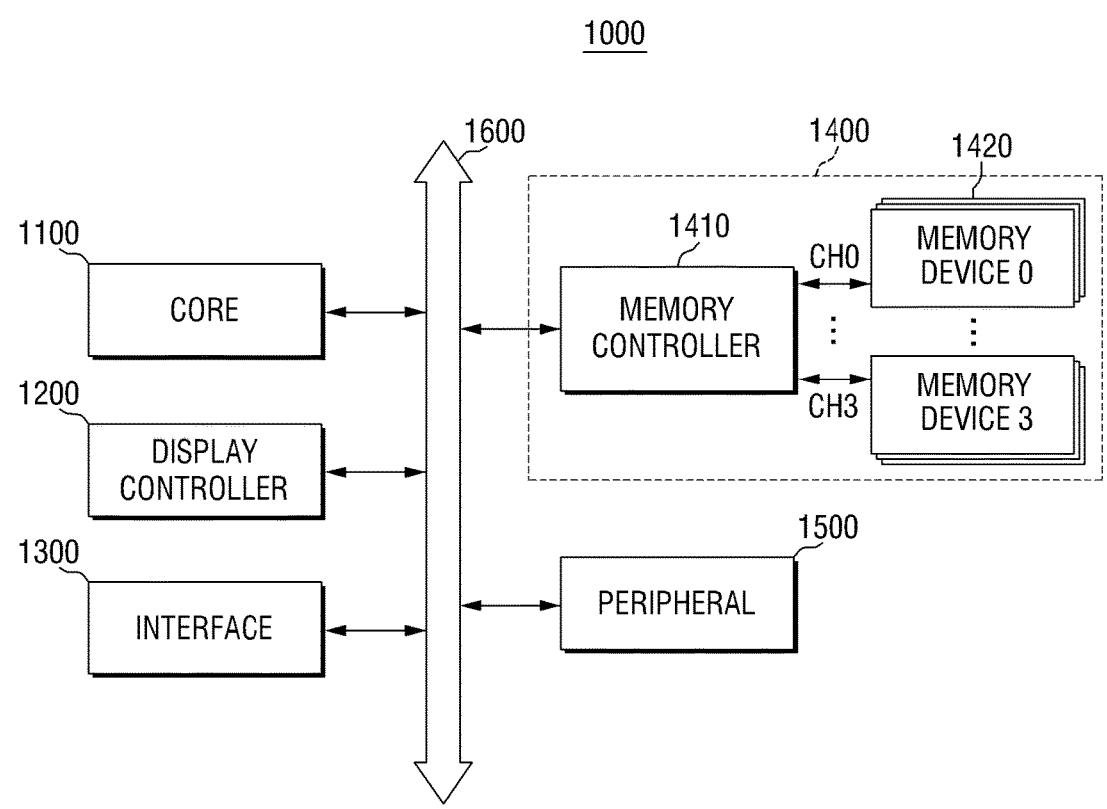
FIG. 8 illustrates a user system including multi channel memories according to some example embodiments of the present inventive concept.

FIG. 8 illustrates a user system including multi channel memories according to some example embodiments of the present inventive concept.

Referring to FIG. 8, the user system 1000 including a multi channel memory according to an embodiment of the present inventive concept may include a core processor (CORE) 1100, a display controller 1200, an interface device (INTERFACE) 1300, a memory system (or a multi channel memory) 1400, a peripheral device (PERIPHERAL) 1500, and a bus 1600.

The core processor 1100, the display controller 1200, the interface device, the memory system 1400 and the peripheral device 1500 may be connected to each other through the bus 1600. The bus 1600 may correspond to a path through which data moves.

The core processor 1100 may include a single core processor or a plurality of cores (multi core) processors. For example, the core processor 1100 may include a multi core processor, such as a dual core processor, a quad core processor, or a hexa core processor. Although not specifically shown in FIG. 8, the core processor 1100 may further include a cache memory positioned inside or outside.

The display controller 1200 controls a display device to display a picture or an image.

The interface device 1300 may transmit data to a communication network or may receive data from the communication network. For example, the interface device 1300 may include an antenna or a wired/wireless transceiver.

The memory system 1400 may be configured to store commands and/or data. The memory system 1400 may include one memory controller 1410 and a plurality of memory devices 1420. The memory devices 1420 may be connected to the memory controller 1410 through the respective channels. Each of the memory devices 1420 may include at least one memory chip or at least one package. In addition, the memory controller 1410 may include the interleaving module 715 shown in FIG. 7.

The peripheral device 1500 may include a serial communication device, a memory management device, an audio processor, and so on.

The user system 1000 including multi channel memories according to some embodiments of the present inventive concept may operate in substantially same manner with the read operating method and the write operating method shown in FIGS. 2 and 3.

While the memory system 1400 having the same configuration with the multi channel memory 700 shown in FIG. 7 is illustrated in FIG. 8, it may be modified to have the same configuration with the multi channel memory 300 shown in FIG. 1. In this case, the bus 1600 may include the channel interleaving module 250 shown in FIG. 1.

Figure 9:
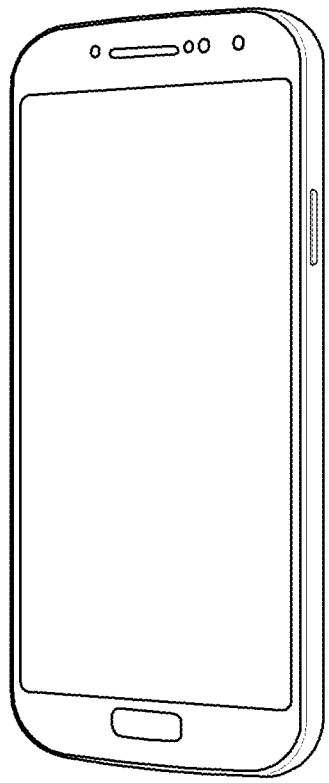
FIG. 9 illustrates an exemplary electronic device employing the user system shown in FIG. 8.

FIG. 9 illustrates an exemplary electronic device employing the user system shown in FIG. 8. In FIG. 9, a smart phone 2000 is illustrated.

Referring to FIG. 9, when the user system 1000 shown in FIG. 8 is applied to the smart phone 2000, at least some components of the user system 1000 may be configured in the form of a system on chip (SOC).

Meanwhile, the user system 1000 may also be applied to other kinds of electronic devices not illustrated herein. For example, the user system 1000 may be provided as one of various components of an electronic device, including a personal computer, an ultra mobile personal computer (UMPC), a work station, a net-book, a personal digital assistant (PDA), a portable computer, a web tablet, a wireless phone, a mobile phone, a smart phone, an e-book, a portable multimedia player (PMP), a potable game console, a navigation device, a black box, a digital camera, a 3-dimensional (3D) television, a digital audio recorder, a digital audio player, a digital picture recorder, a digital picture player, digital video recorder, a digital video player, a device capable of transmitting/receiving information in wireless environments, one of various electronic devices constituting a home network, one of various electronic devices constituting a computer network, one of various electronic devices constituting a telematics network, RFID devices, or embedded computing systems.

The steps or actions of the method or algorithm described above in connection with the embodiments of the present inventive concept may be embodied directly in hardware, in a software module executed by a processor, or in a combination of the two. A software module may reside in a random access memory (RAM), a flash memory, a read-only memory (ROM), an erasable programmable read-only memory (EPROM), an electrically erasable programmable read-only memory (EEPROM), a register, a hard disk, a removable disk, a compact disk read-only memory (CD-ROM), or any other form of storage medium known in the art. An exemplary storage medium may be coupled to the processor, such that the processor can read information from, and write information to, the storage medium. Alternatively, the storage medium may be integral to the processor. Further, in some aspects, the processor and the storage medium may reside in an ASIC. Additionally, the ASIC may reside in a user terminal. The processor and the storage medium may reside as discrete components in a user terminal.

While the present inventive concept has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the present invention.

What is claimed is:

1. An operating method for a system comprising a multi channel memory including a respective set of memories, wherein each set includes one or more memories, the operating method comprising:
receiving access requests including system addresses for a multi channel memory including $2^n$ channels, where n is a natural number greater than 0;
allocating a first channel of the $2^n$ channels based on n+1 or more bits of a first address of the system addresses;
performing an access of a respective set of memory devices through the allocated first channel; and
allocating all of the $2^n$ channels based on the system addresses including an overall range of addresses from a first address to a final address,
wherein the system addresses are arranged as follows:
m sets of addresses, each set of the m sets including a particular range of the overall range of addresses, wherein the last address of a first set of the m sets of addresses is a consecutive address with the first address of a second set of the m sets of addresses, the second set being adjacent to the first set, wherein m is a natural number greater than 0; and
k groups of addresses in each set of the m sets, each group including a sub-range of the particular range, wherein k is a natural number greater than 0, wherein $1^{st}$ through $k^{th}$ groups in one set of the m sets correspond respectively to $1^{st}$ through $k^{th}$ groups in another set of the m sets, and
wherein the allocating all of the $2^n$ channels is performed in a first order in a first particular range of the overall range of addresses and in a second order different from the first order in a second particular range of the overall range of addresses different from the first particular range.

2. The operating method of claim 1, wherein the n+1 or more bits of the first address of the system addresses include n bits and one or more higher bits than the n bits.

3. The operating method of claim 2, wherein one or more lower bits than the n bits corresponds to an interleave unit of the multi channel memory.

4. The operating method of claim 2, wherein the n bits are consecutive bits.

5. The operating method of claim 1, wherein the allocating the first channel of the $2^n$ channels comprises:
generating a channel address using the n+1 or more bits of the first address of the system addresses; and
allocating the first channel of the $2^n$ channels according to the channel address.

6. The operating method of claim 5, wherein the channel address includes n bits.

7. The operating method of claim 1, wherein allocating the first channel of the $2^n$ channels is performed by a bus of the system or a memory controller of the system.

8. The operating method of claim 1, wherein the access includes a read or a write operation.

9. The operating method of claim 1, wherein each of the one or more memories includes a volatile memory or a nonvolatile memory.

10. The operating method of claim 1, further comprising:
during performing an access of a respective set of memories through the first channel, allocating a second channel of the $2^n$ channels based on n+1 or more bits of a system address and performing an access of a respective set of memories through the second channel.

11. An operating method for a system comprising a multi channel memory, each channel connected to a respective set of memories, wherein each set includes one or more memories, the operating method comprising:
receiving access requests including logical addresses for a multi channel memory having multiple channels, wherein the logical addresses include an overall range of addresses from a first address to a final address;

allocating all of the multiple channels in response to the logical addresses; and performing an access from/to a respective set of memories through the allocated first channel, wherein the allocating all of the multiple channels is performed in a first order in a first particular range of the overall range of addresses and in a second order different from the first order in a second particular range of the overall range of addresses different from the first particular range based on a minimum number of bits of the logical addresses required for allocating all of the multiple channels and one or more additional bits of the logical addresses.

12. The operating method of claim 11, wherein the logical addresses include:

m sets of addresses, each set of the m sets including a particular range of the overall range of addresses, wherein the last address of a first set of the m sets of addresses is a consecutive address with the first address of a second set of the m sets of addresses, the second set being adjacent to the first set, wherein m is a natural number greater than 0; and k groups of addresses in each set of the m sets, each group including a sub-range of the particular range, wherein k is a natural number greater than 0, wherein $1^{st}$ through $k^{th}$ groups in one set of the m sets correspond respectively to $1^{st}$ through $k^{th}$ groups in another set of the m sets.

13. The operating method of claim 12, wherein when the multi channel memory has $2^n$ channels, where n is a natural number greater than 1, the minimum number of bits required for allocating all of the multiple channels is n bits.

14. The operating method of claim 12, wherein a respective particular range of the overall range of addresses is defined on the basis of the one or more additional bits.

15. The operating method of claim 12, wherein the allocating of one of the multiple channels comprises:

generating a channel address using the minimum number of bits required for allocating all of the multiple channels and the one or more additional bits of the logical addresses; and allocating one of the multiple channels according to the channel address.

16. The operating method of claim 15, wherein the channel address includes the minimum number of bits required for allocating all of the multiple channels.

17. A system comprising:

n channels each connected to a respective set of memory devices, each set including one or more memory devices, n being a natural number greater than 1; and a first circuit configured to receive access requests including addresses, and allocate one channel of the n channels to access a respective set of memory devices through the allocated channel in response to an address, wherein the first circuit is configured to allocate each channel of the n channels based on a minimum number of bits of the addresses required for allocating all of the n channels and one or more additional bits of the addresses, wherein the first circuit is configured to allocate all of the n channels in response to the addresses including an overall range of addresses from a first address to a final address, wherein the addresses are arranged as follows:

m sets of addresses, each set of the m sets including a particular range of the overall range of addresses, wherein the last address of a first set of the m sets of addresses is a consecutive address with the first address of a second set of the m sets of addresses, the second set being adjacent to the first set, wherein m is a natural number greater than 0; and k groups of addresses in each set of the m sets, each group including a sub-range of the particular range, wherein k is a natural number greater than 0, wherein $1^{st}$ through $k^{th}$ groups in one set of the m sets correspond respectively to $1^{st}$ through $k^{th}$ groups in another set of the m sets, and wherein the first circuit is configured to allocate all of the n channels in a first order in a first particular range of the overall range of addresses and in a second order different from the first order in a second particular range of the overall range of addresses.

18. The system of claim 17, wherein the first circuit is configured to perform a first function based on a first bit of the minimum number of bits of the addresses required for allocating all of the n channels and one or more additional second bits of the addresses, and a second function based on a third bit of the minimum number of bits and one or more additional fourth bits of the addresses, wherein the first circuit is configured to allocate all of the n channels based on the result of the performing the first and second functions, and wherein each of the first bit of the minimum number of bits of the addresses, the one or more additional second bits of the addresses, the third bit of the minimum number of bits, and the one or more additional fourth bits of the addresses is different from each other.

* * * * *